United States Patent [19]

Shigihara et al.

[11] 4,375,885
[45] Mar. 8, 1983

[54] REVERBERATORY FURNACE

[75] Inventors: Shigeyuki Shigihara, Ise; Masahiro Tadokoro, Mie, both of Japan

[73] Assignee: Shinko Electric Co., Ltd., Nihonbashi, Japan

[21] Appl. No.: 212,882

[22] Filed: Dec. 4, 1980

[30] Foreign Application Priority Data

Feb. 13, 1980 [JP] Japan .................... 55-17044
Jul. 31, 1980 [JP] Japan .............. 55-109477[U]

[51] Int. Cl.³ .................... C21C 5/04; F27D 9/14
[52] U.S. Cl. .................... 266/214; 266/237; 75/445; 75/61; 417/50; 198/619
[58] Field of Search .............. 266/214, 237; 417/50; 222/594; 414/150; 198/619; 75/61, 10 R, 44 S

[56] References Cited

U.S. PATENT DOCUMENTS

| 3,980,284 | 9/1976 | Shigihara et al. | 266/237 |
| 4,079,920 | 3/1978 | Mischenko et al. | 266/237 |
| 4,147,531 | 4/1979 | Miller | 75/44 |

FOREIGN PATENT DOCUMENTS

| 54-87613 | 7/1979 | Japan . | |
| 725175 | 3/1980 | U.S.S.R. | 417/50 |

OTHER PUBLICATIONS

ASEA Journal 1971, vol. 44, No. 4.

*Primary Examiner*—L. Dewayne Rutledge
*Assistant Examiner*—Alan E. Schiavelli
*Attorney, Agent, or Firm*—McDougall, Hersh & Scott

[57] ABSTRACT

A reverberatory furnace includes a reverberatory furnace body for melting metal and holding molten metal, having an opening well, an electromagnetic trough for transporting hot molten metal from the reverberatory furnace body upwardly and slantly, having an inductor for generating a travelling magnetic field, and a guide trough for guiding the hot molten metal from the electromagnetic trough to the opening well. The hot molten metal is circulated through the reverberatory furnace.

12 Claims, 13 Drawing Figures

REVERBERATORY FURNACE

BACKGROUND OF THE INVENTION

1. Field of the Invention:

This invention relates to a reverberatory furnace, and more particularly to a reverberatory furnace for melting metal and holding molten metal.

2. Description of the Prior Art:

Reverberatory furnaces are widely used for melting aluminum or aluminum alloy. Generally, a burner is mounted on a side wall oppositely to, and far from an opening well to supply metal to be molten, in the reverberatory furnace. Thus, it is avoided that metal to be molten contacts directly with flame of the burner. Or a refractory shield member is arranged between the burner and the opening well to supply metal to be molten so as to avoid the direct contact with flame of the burner. This type of furnace is called as "opening well reverberatory furnace."

In use of the reverberatory furnace, metal to be molten is dropped into molten metal through the opening well. Metal receives heat from molten metal, and is molten without directly contacting with flame of the burner. Before the reverberatory furnace is used in such a manner, metal as base is supplied into the interior of the reverberatory furnace to form a molten metal pool, or molten metal is supplied into the reverberatory furnace to form the molten metal pool, from another furnace or vessel.

Metal is supplied into the pool through the opening well. Heat is transferred from the pool to the metal to melt the latter. Metal is thus molten without direct contact with flame of the burner. If metal contacts directly with flame of the burner, oxide is formed on metal such as aluminum. The molten metal oxide is slag or impurity. It should be removed, and so it causes decrease of yield rate. Accordingly, it is required to avoid direct contact of metal with flame of the burner.

However, in the reverberatory furnace, temperature decreases with the distance from the burner. Accordingly, the temperature of the molten metal is the lowest at the opening well which is farthest from the burner. It takes much time to melt metal dropped into the molten metal at the opening well. The melting efficiency of the reverberatory furnace becomes low.

Hitherto, to improve the melting efficiency of the reverberatory furnace, the molten metal therein was manually or mechanically stirred so as to move from the neighbourhood of the burner to the opening well. However, the manual stir takes much labor, and it is dangerous. And mechanical elements are often damaged in the mechanical stir.

SUMMARY OF THE INVENTION

Accordingly, it is an object of this invention to provide a reverberatory furnace the melting efficiency of which is improved without the above-described defects.

Another object of this invention is to provide a reverberatory furnace which is economical in operation.

A further object of this invention is to provide a reverberatory furnace in which fine metal scrap such as fine aluminum scrap can be molten with high melting efficiency.

A still further object of this invention is to provide a reverberatory furnace the yielding rate of which is higher.

In accordance with an aspect of this invention, a reverberatory furnace includes a reverberatory furnace body for melting metal and holding molten metal, the reverberatory furnace body including an opening well an electromagnetic trough for transporting hot molten metal from the reverberatory furnace body upwardly and slantly, the electromagnetic trough including means for generating a traveling magnetic field, and guide means for guiding the hot molten metal from the electromagnetic trough to said opening well.

The other objects features and advantages of this invention will be apparent from the following description taken in conjunction with the accompanying drawings.

DETAILED DESCRIPTION OF PREFERRED EMBODIMENTS

Next, a reverberatory furnace according to a first embodiment of this invention will be described with reference to FIG. 1 to FIG. 4.

Figure 1:
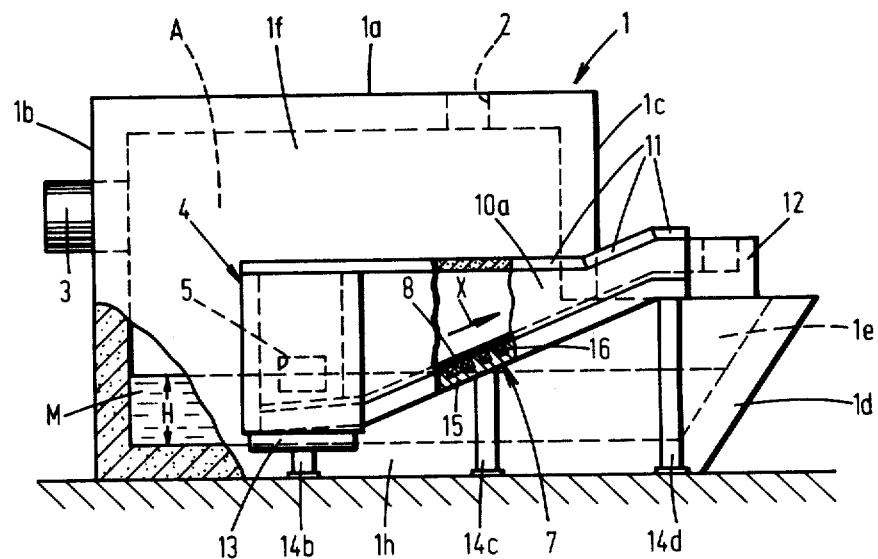
FIG. 1 is a side view of a reverberatory furnace according to a first embodiment of this invention.
Figure 2:
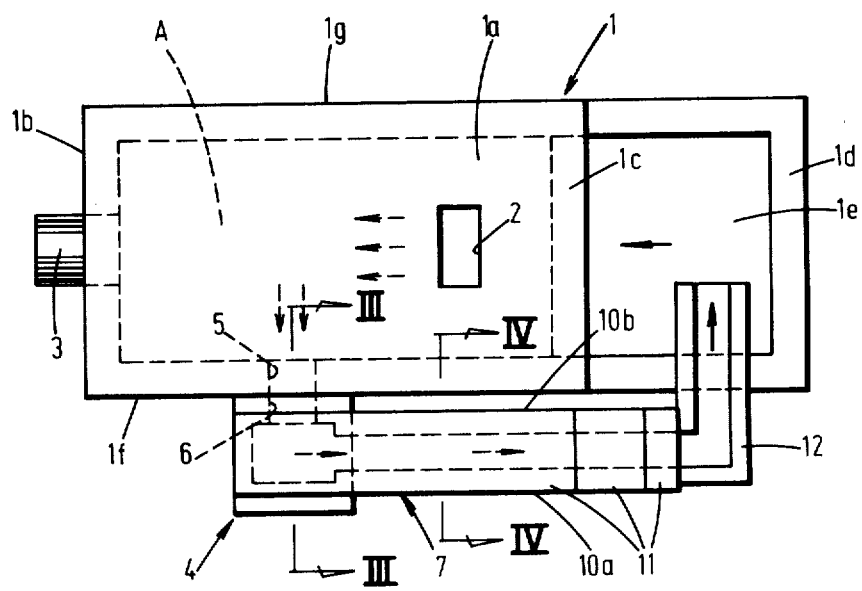
FIG. 2 is a plan view of the reverberatory furnace of FIG. 1.

Referring to FIG. 1 and FIG. 2, a reverberatory furnace body 1 is generally in the shape of rectangular parallelpiped, and it is made of refractory material, for example, refractory castable cement whose main chemical composition is $Al_2O_3$. In the reverberatory furnace body 1, a gas discharge opening 2 is made in an upper wall 1a. A burner 3 is mounted on a rear side wall 1b. An opening well 1e for supplying metal to be molten is formed between an upper front side wall 1c and a lower front side wall 1d. The opening well 1e is often called "well". A molten metal path hole 5 is made in one side wall 1f. A main part A of the reverberatory furnace body 1 is constituted as a heating portion by the upper wall 1a, rear side wall 1b, side walls 1f and 1g, upper front side wall 1c and bottom wall 1h. The heating portion A of the reverberatory furnace body 1 is heated at high temperature by flame of the burner 3.

A molten metal vessel 4 made of refractory material is combined with the reverberatory furnace body 1. A molten metal path hole 6 is made in a side wall 4a of the molten metal vessel 4, and it communicates with the path hole 5 made in the side wall 1f of the reverberatory furnace body 1. Hot molten metal M is led through the hot molten metal paths 5 and 6 from the reverberatory furnace body, into the vessel 4. The bottom of the vessel 4 is occupied by one end portion of an electromagnetic trough 7 to be described hereinafter. An upper opening of the vessel 4 is covered with one of cover members 11. The vessel 4 is supported through a supporting plate 13 by poles 14a and 14b.

Figure 3:
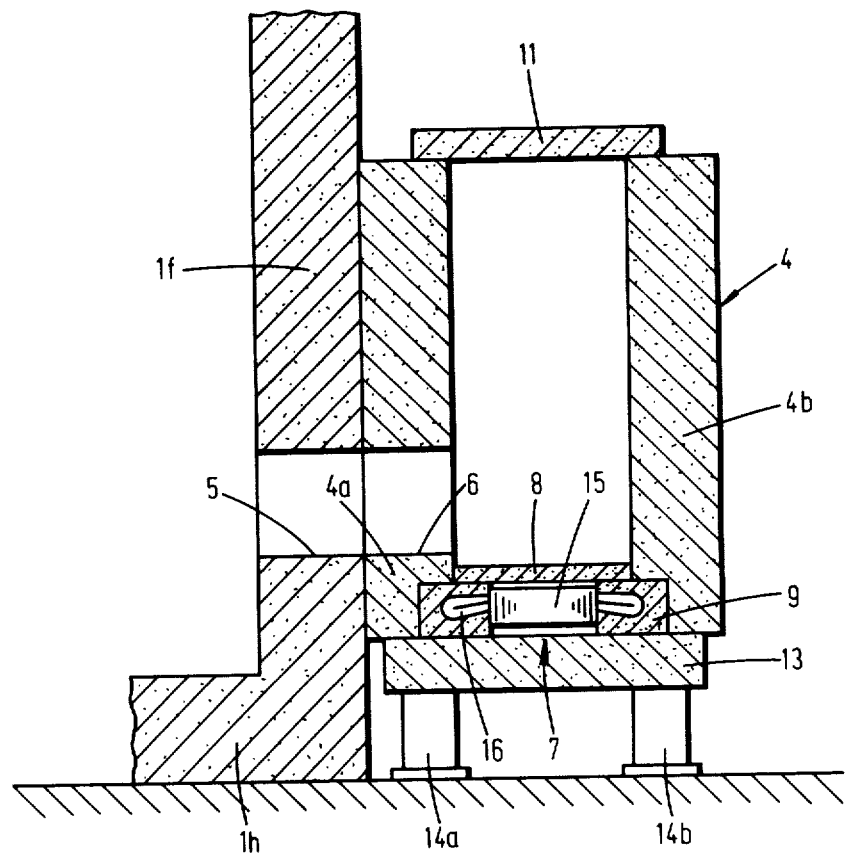
FIG. 3 is an enlarged cross-sectional view taken along the line III—III on FIG. 2.
Figure 4:
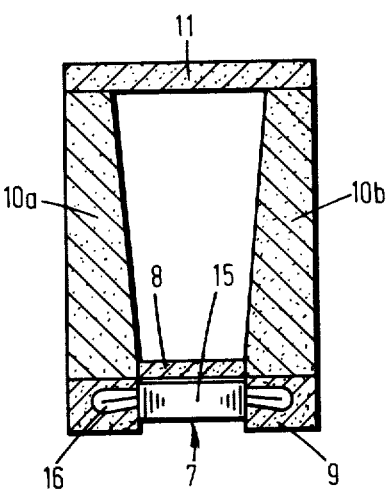
FIG. 4 is an enlarged cross-sectional view taken along the line IV—IV on FIG. 2.

As shown in FIG. 1, the electromagnetic trough 7 is upwardly and slantly arranged at the side of the reverberatory furnace body 1, and it includes an iron core 15, AC coils 16 received in grooves of the iron core 15, a bottom board 8 and side walls 10a and 10b (also see FIGS. 2 and 4). The side walls 10a and 10b are made of usual refractory material, but the bottom board 8 is made of ceramic material which is prebaked, and consists of aluminum titanate. Sufficient magnetic field should be applied to the molten metal on the bottom board 8. Accordingly, it is required that the bottom board 8 is as thin as possible protecting the inductor constituted by the iron core 15 and the AC coils 16. For that requirement, the ceramic board which is made of aluminum titanate and prebaked, superior in refractory ability, is used as the bottom 8 of the electromagnetic trough 7. The coil ends of the AC coils 16 are molded with refractory material 9. In the one end portion of the electromagnetic trough 7, the side walls thereof are formed by the side walls 4a and 4b of the molten metal vessel 4 as shown in FIG. 3. Although not shown, the iron core 15 is fixed to the refractory member 9 by iron plate and bolts.

The electromagnetic trough 7 is covered with the cover members 11, and it is supported by supporting poles 14c and 14d. The cover members 11 are demountably mounted on the molten metal vessel 4 and the electromagnetic trough 7. When they are cleaned, the cover members 11 are demounted from them.

A guide trough 12 made of refractory material is laterally connected to the top end of the electromagnetic trough 7. The molten metal M is introduced through the guide trough 12 into the opening well 1e of the reverberatory furnace body 1.

Next, there will be described operations of the above-described reverberatory furnace.

Initially, a molten metal pool should be made, for example, to a level H shown in FIG. 1, in the reverberatory furnace body 1. For that purpose, metal lumps such as aluminum ingots are put into the heating portion A of the reverberatory furnace body 1. The metal lumps are heated directly by flame of the burner 3 and radiant heat from the walls of the reverberatory furnace body 1. They are molten to form a molten metal pool to the level H in the reverberatory furnace body 1. Alternatively, molten metal is supplied to the reverberatory furnace to make the pool, from another furnace or vessel.

The AC coils 16 in the electromagnetic trough 7 are energized to generate a travelling magnetic field in the direction shown by an arrow x in FIG. 1. The hot molten metal M which has been introduced into the hot molten metal vessel 4 through the paths 5 and 6 from the heating portion A of the reverberatory furnace body 1, is pushed upwardly and slantly along the bottom board 8 of the electromagnetic trough 7 by interaction of the travelling magnetic field and eddy currents which are induced in the molten metal. The molten metal M is introduced from the top end portion of the electromagnetic trough 7 to the guide trough 12 which may be horizontally arranged, but which is preferably inclined downwards. The molten metal M flows through the guide trough 12, and it is discharged into the opening well 1e of the reverberatory furnace body 1. As the result, the molten metal M is circulated in the manner shown by arrows in FIG. 2, in the reverberatory furnace. In other words, the molten metal M is stirred to obtain uniform temperature distribution. Since the molten metal M in the opening well 1e contacts directly with external atmosphere, it is liable to be cooled. However, according to this invention, the molten metal M is circulated through the reverberatory furnace, and the hot molten metal M from the heating portion A of the reverberatory furnace body 1 is led into the opening well 1e. Accordingly, the temperature of the molten metal M in the opening well 1e is almost equal to that of the molten metal in the heating portion A of the reverberatory furnace body 1.

According to this embodiment, the electromagnetic trough 7 and the hot molten metal 4 are further covered with the cover members 11 to enclose the molten metal path. Accordingly, hot air from the heating portion A of the reverberatory furnace body 1 is passed through the molten metal path of the electromagnetic trough 7. The lowering of the temperature of the molten metal during the circulation is thus avoided. As the case may be, the guide trough 12 may be covered with a cover member. The AC coils 16 are continuously or intermittently energized.

Metal, for example, aluminum is dropped into the supply opening 1e of the reverberatory furnace body 1 in the form of lump or scrap. It receives heat from the molten metal M surrounding the lump or scrap, and it is gradually melted into the molten metal M. If the lump or scrap of metal is supplied into the opening well of the conventional reverberatory furnace, its melting speed would be low, since the temperature of the molten metal is much lower in the opening well than in the heating portion. However, according to this invention, the temperature of the molten metal M is homogeneous in the reverberatory furnace body 1. The melting speed of the lump or scrap of metal is higher than in the conventional reverberatory furnace. Accordingly, the melting efficiency is higher.

Figure 5:
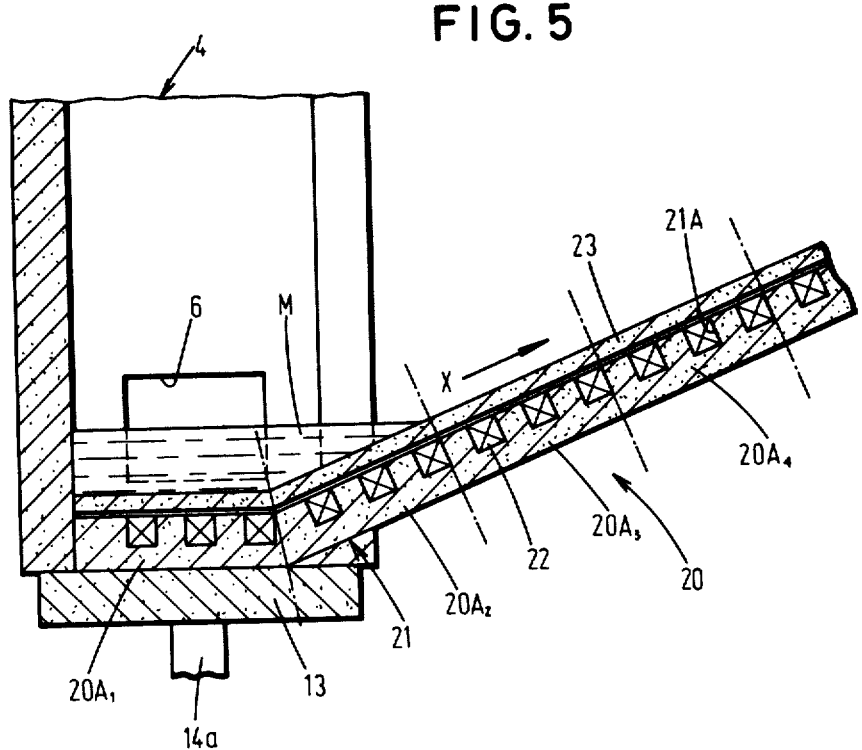
FIG. 5 is a cross-sectional view of an important part of a reverberatory furnace according to a second embodiment of this invention.

FIG. 5 is a cross-sectional view of an important part of a reverberatory furnace according to a second embodiment of this invention.

An inductor of an electromagnetic trough is, in principle, a stator of an induction motor which has been split along its longitudinal axis and unrolled into a flat plane. For polyphase windings, an iron core is divided into plural core sections in dependence on the pole number. Accordingly, plural pole boundaries are formed along the longitudinal direction of the electromagnetic trough. Pole boundaries are shown by dot-dash lines in FIG. 5.

In relation to the fact that the stator of the induction motor is circular, end portions of the electromagnetic trough are singular in construction and function. Accordingly, although it is preferable that the electromagnetic travelling force of the electromagnetic trough is uniform along the whole length of the latter, the electromagnetic travelling force is very small in the end portions of the electromagnetic trough. Such phenomenon is well known as "longitudinal edge effect".

In FIG. 5, parts which corresponds to thoes in FIGS. 1 to 4 are denoted by the same reference numerals. An electromagnetic trough is denoted by a reference numeral 20. An inductor for generating a travelling magnetic field consists of an iron core 21 and AC coils 22 received in grooves 21a of the iron core 21. For the above-described reason, the inductor is divided into plural core sections $20A_1$, $20A_2$, $20A_3$ and $A_4$—. A bottom board 23 is arranged above the inductor, made of the same material as the bottom board 8 of the first embodiment.

Referring to FIG. 5, the first core section $20A_1$ and the corresponding portion of the bottom board 23 are horizontal, while the other core sections $20A_2$, $20A_3$, $20A_4$— are inclined at a predetermined angle which is, for example, about 5 to 25 degrees. When the AC coils 22 are energized, the molten metal M is flowed upwards in the direction shown by the arrow X.

However, if the first core section $20A_1$ and the corresponding portion of the bottom board 23 are inclined as the other core sections $20A_2$, $20A_3$—, the molten metal M would be difficult to flow upwards, or would not flow upwards. Particularly, if the level of the molten metal M is near the lower side of the path hole 6 shown by the dotted line in FIG. 5, and the first core section $20A_1$ and the corresponding portion of the bottom board 23 are inclined as the other core sections $20A_2$, $20A_3$—, the molten metal M would not flow upwards. According to this embodiment, even the case when the molten metal M is very little in the reverberatory furnace body 1, it can be circulated through the reverberatory furnace.

Figure 6:
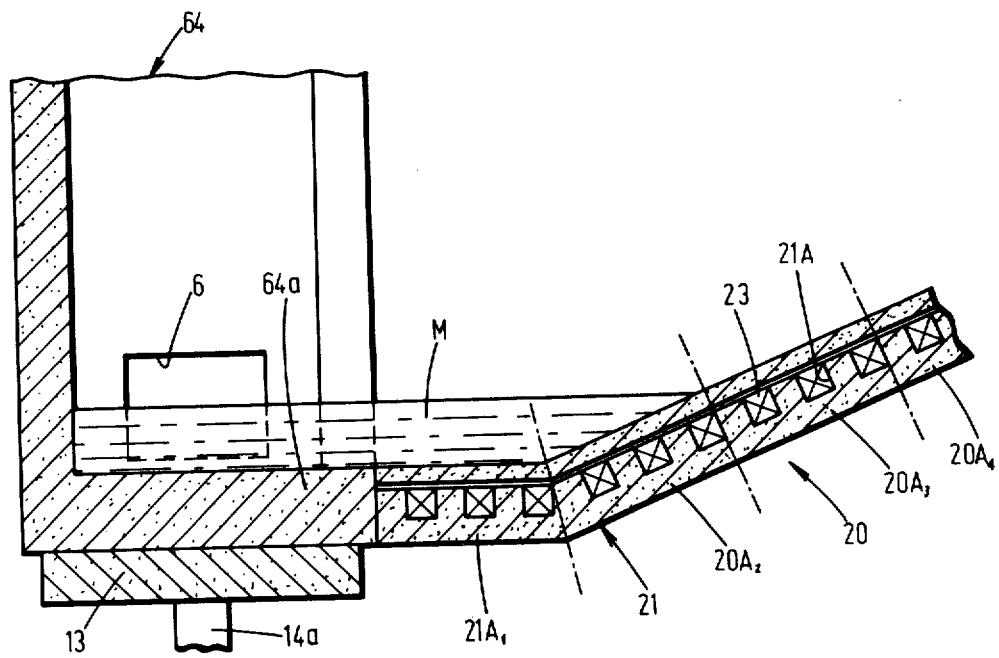
FIG. 6 is a cross-sectional view of an important part of a reverberatory furnace according to a third embodiment of this invention.

FIG. 6 is a cross-sectional view of an important part of a third embodiment of this invention. Parts in FIG. 6 which correspond to thoes in FIG. 1 to FIG. 5 are denoted by the same reference.

In this embodiment, the electromagnetic trough 20 of FIG. 6 is connected to a front end of a bottom wall 64a of a hot molten metal vessel 64 which is combined with the reverberatory furnace body 1 in the same manner as the hot molten metal vessel 4 of the first embodiment, although the bottom wall is formed by the part of the electromagnetic trough 7 in the hot molten metal vessel 4 of the first embodiment. The hot molten metal path hole 5 is made almost in the lowermost of the side wall of the vessel 64, almost contacting with the bottom wall 64a. Although not shown, a hot molten metal path hole is made in the side wall of the reverberatory furnace body 1, communicating with the hot molten metal path hole 6. The portion of the bottom board 23 corresponding to the first core section $20A_1$, in the electromagnetic trough 20, is flush with the surface of the bottom wall 64a of the hot molten metal vessel 64. In this embodiment, even the case that the molten metal M is reduced to the minimum in the reverberatory furnace body 1, the molten metal M can be flowed upwards along the bottom board 23, and so it can be circulated through the reverberatory furnace.

Figure 7:
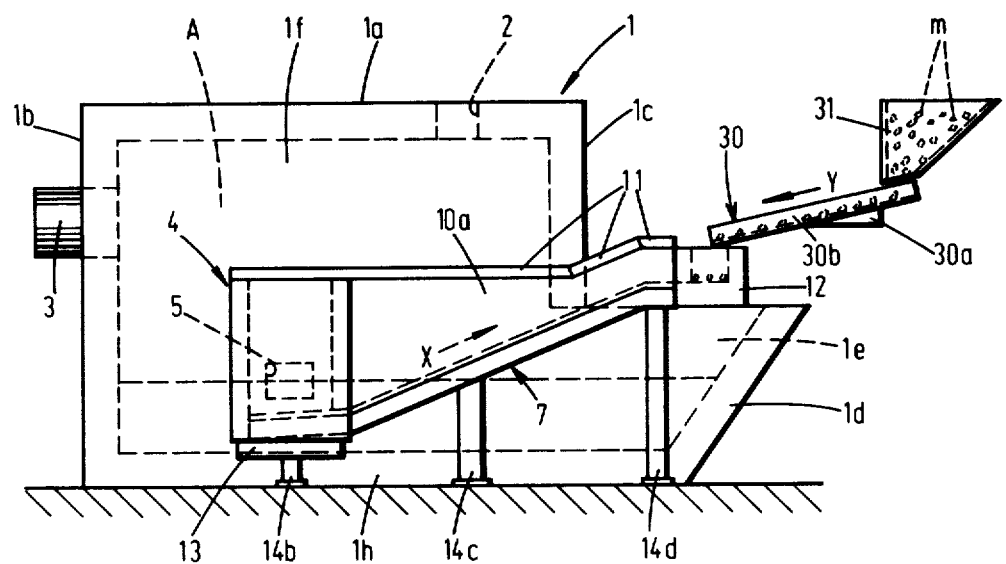
FIG. 7 is a side view of a reverberatory furnace according to a fourth embodiment of this invention.
Figure 8:
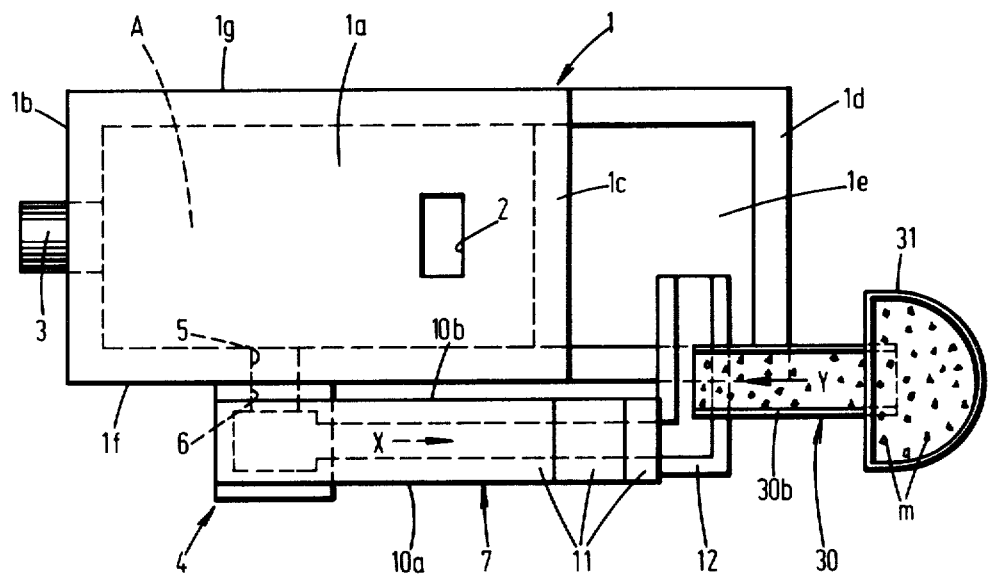
FIG. 8 is a plan view of the reverberatory furnace of FIG. 7.

FIG. 7 is a side view of a reverberatory furnace according to a fourth embodiment of this invention, and FIG. 8 is a plan view of the reverberatory furnace of FIG. 7. Parts in FIG. 7 and FIG. 8 which correspond to thoes in FIG. 1 and FIG. 2, are denoted by the same reference numerals, the description of which will be omitted.

In this embodiment, a feeder 30 and a hopper 31 for storing fine metal scrap are added to the reverberatory furnace of the first embodiment. The reverberatory furnace of this embodiment is very suitable for melting fine metal scrap. For example, the fine metal scrap is aluminum scrap or aluminum alloy scrap which is cutting scrap from a lathe or milling machine, or chops of recovered empty cans.

The feeder 30 is, for example, a vibratory feeder. A vibrating drive source 30a is fixed on a bottom of a trough 30b. A discharge end of the trough 30b faces to the intermediate portion of the guide trough 12. The hopper 31 contains aluminum scrap or aluminum alloy scrap m, and it is arranged above the rear end portion of the trough 30b. The scrap m is discharged from the bottom opening of the hopper 31, and transported on the trough 30b in the direction shown by an arrow Y, by the vibrating drive source 30b which is driven continuously or intermittently.

The scrap m is discharged into the flow of the molten metal M in the guide trough 12 from the discharge end of the trough 30b of the feeder 30. Since the molten metal M flows in the guide trough 12, the fine scrap m is effectively mixed with the molten metal M, and receives heat from the surrounding molten metal M to start melting. The still not-molten fine scrap m falls down with the molten metal M from the discharge end of the guide trough 12 into the opening well 1e of the reverberatory furnace body 1, and it is molten there.

Next, there will be described the reason for the suitability of this embodiment to the fine metal scrap.

When metal is heated with the molten metal in contact with air, metal oxide is formed on the metal, resulting in the decrease of the recovery rate of the metal. For example, the case that 1 kilograms of aluminum bar is molten in a reverberatory furnace, will be compared with the case that 1 kilograms of aluminum cutting scrap is molten in the same reverberatory furnace. The yield rate of aluminum oxide is higher in the latter case than in the former case. On other words, the recovery rate of aluminum is lower in the latter case than in the former case. The specific surface area of the aluminum cutting scrap is larger than that of the aluminum bar. The aluminum cutting scrap having larger specific surface area is harder to sink into the molten metal, and liable to float on the molten metal. When the scrap floats on the molten metal, it is heated in contact with air from the molten metal. The metal oxide is formed on the scrap, resulting in the decrease of the recovery rate of the metal. Further, the melting time of the aluminum cutting scrap is longer than that of the aluminum bar, since the aluminum cutting scrap is more liable to float on the molten metal and to contact with air.

In order to improve the recovery rate of the metal, it is required that the metal is heated by the molten metal without contact with air. In the fourth embodiment, the fine aluminum scrap m is dropped into the flowing molten metal M in the guide trough 12. Accordingly, it is effectively mixed with the molten metal. The time that the aluminum scrap m is heated by the molten metal M in contact with air, is reduced to the minimum. As the result, the recovery rate of aluminum by the reverberatory furnace according to the fourth embodiment is higher, and the melting time of the aluminum scrap m thereby is shorter.

Figure 9:
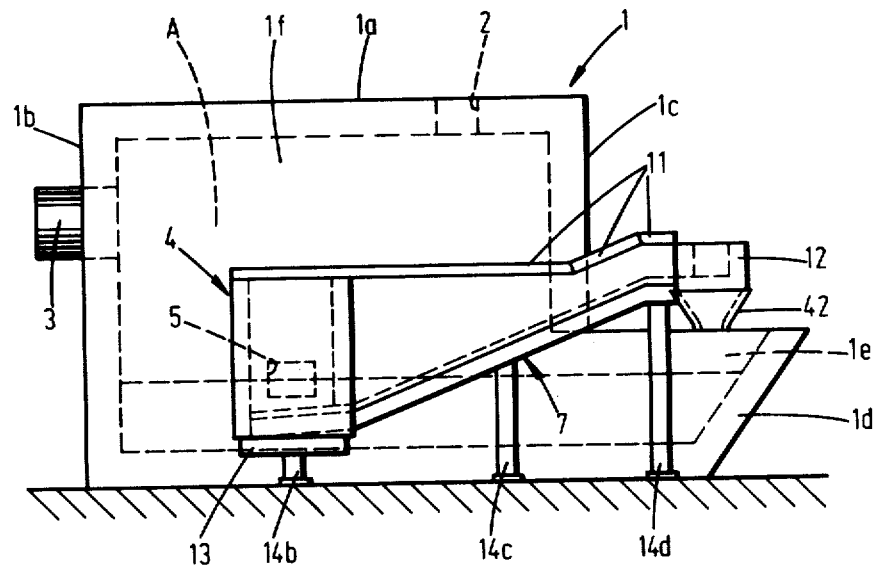
FIG. 9 is a side view of a reverberatory furnace according to a fifth embodiment of this invention.
Figure 10:
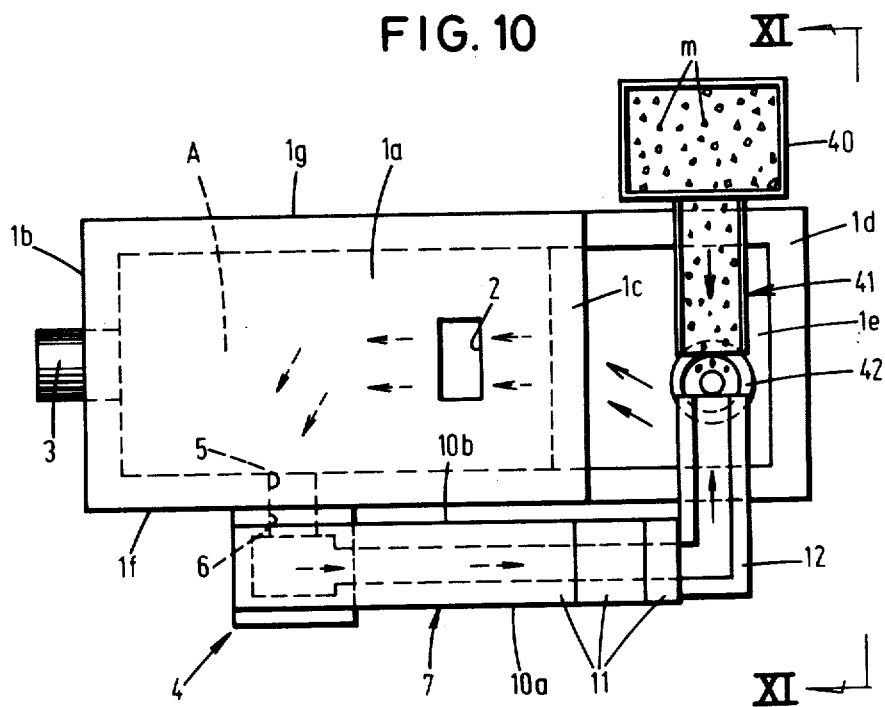
FIG. 10 is a plan view of the reverberatory furnace of FIG. 9.
Figure 11:
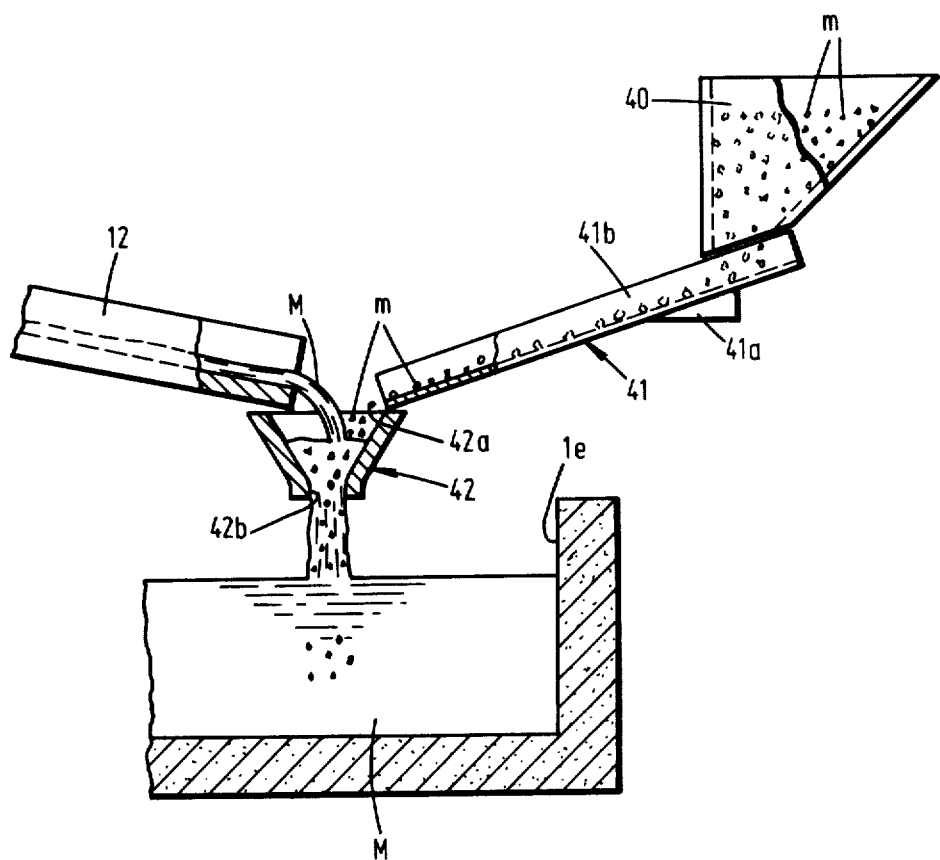
FIG. 11 is a partly broken view taken along the line XI—XI on FIG. 10.

FIG. 9, FIG. 10 and FIG. 11 show a reverberatory furnace according to a fifth embodiment of this invention which is suitable for melting fine metal scrap. Parts in FIG. 9 to FIG. 11 which correspond to those of FIG. 1 to FIG. 4, are denoted by the same reference numerals, the description of which will be omitted.

In this embodiment, a hopper 40 for storing fine aluminum scrap m, a vibratory feeder 41 and an intermediate vessel 42 are added to the reverberatory furnace of the first embodiment. The intermediate vessel 42 is generally conical, and it is arranged above the opening well 1e of the reverberatory furnace body 1. An upper opening 42a of the intermediate vessel 42 is wider than a lower opening 42b thereof. Although not shown, the hopper 40 and the intermediate vessel 42 are fixed to a stationary body, and the vibratory feeder 41 is suspended from a stationary body. One end of a trough 41b of the feeder 41 faces to an opening of the hopper 40, and another end of the trough 41b of the feeder 41 faces to the upper opening 42a of the intermediate vessel 42. Further, the discharge end of the guide trough 12 for introducing the hot molten metal M faces to the upper opening 42a of the intermediate vessel 42.

A vibratory drive source 41a is fixed on the bottom of the trough 41b. The aluminum scrap m is discharged into the intermediate vessel 42 at a constant rate from the trough 41b by energization of the vibratory drive source 41a. On the other hand, the hot molten metal M is supplied to the intermediate vessel 42 as shown in FIG. 11. The aluminum scrap m and the molten metal M are mixed with each other in the intermediate vessel 42. The mixture is discharged from the lower opening 42b of the intermediate vessel 42, and falls down into the molten metal in the opening well 1e of the reverberatory furnace body 1.

In the intermediate vessel 42, the hot molten metal M and the fine aluminum scrap m are agitated by guiding function of the vessel 42 and kinetic energy due to falling. Accordingly, they are effectively mixed with each other in the vessel 42. Almost all of the fine aluminum scrap m is molten in the intermediate vessel 42, scarcely contacting with air. The still not-molten aluminum scrap m discharged from the intermediate vessel 42 is sunk into the molten metal M by kinetic energy due to falling and successive downward flow of the molten metal M from the intermediate vessel 42, scarcely contacting with air. While the fine aluminum scrap m sinks in the molten metal M or rises toward the molten metal surface, it is perfectly molten by heat of the molten metal M. Accordingly, the melting time and the recovery rate are improved by the reverberatory furnace of this embodiment.

Figure 12:
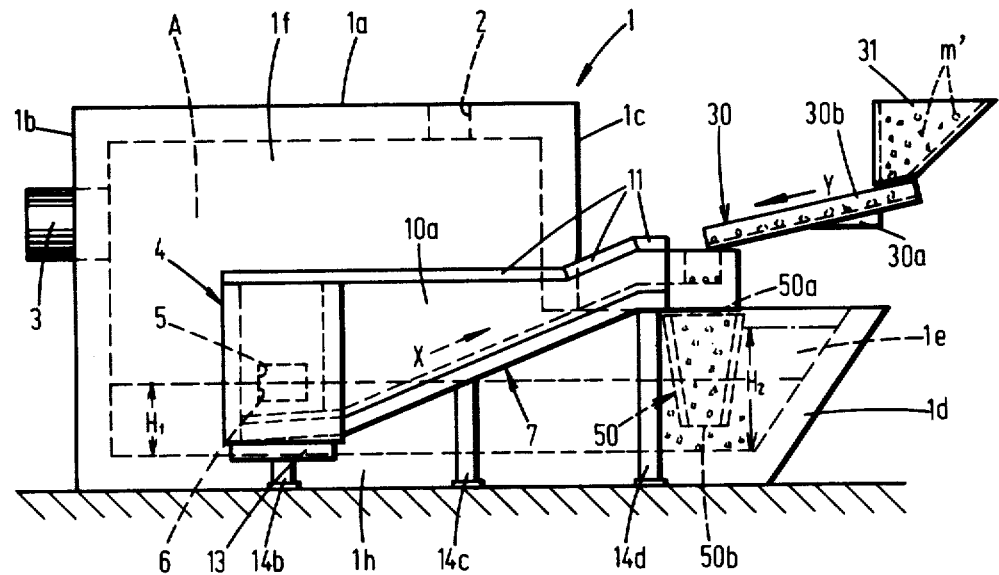
FIG. 12 is a side view of a reverberatory furnace accoridng to a sixth embodiment of this invention.
Figure 13:
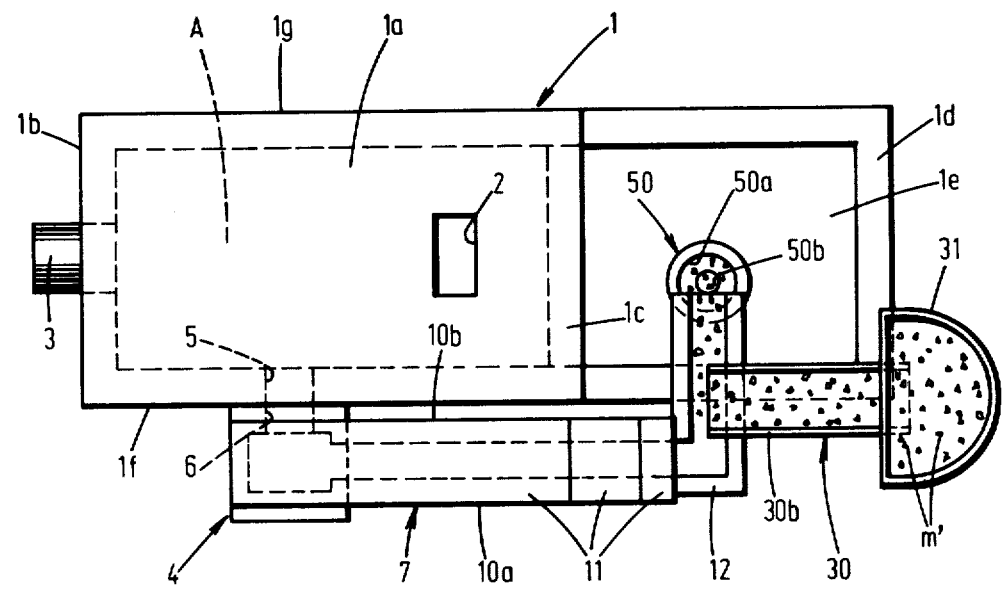
FIG. 13 is a plan view of the reverberatory furnace of FIG. 12.

FIG. 12 and FIG. 13 show a reverberatory furnace according to a sixth embodiment of this invention, which also is suitable for melting fine metal scrap. Parts in FIG. 12 and FIG. 13 which correspond to thoes in FIG. 7 and FIG. 8, are denoted by the same reference numerals, the description of which will be comitted.

In this embodiment, a guide frame 50 is added to the fourth embodiment shown in FIG. 7 and FIG. 8. The reverberatory furnace of this embodiment is more preferable for metal scrap which is finer or more liable to float than the aluminum scrap m in the fourth embodiment, or for the case that the molten metal flow in the guide trough 12 is calm or its flow rate is low.

The guide frame 50 is conical, and it is so fixed to the reverberatory furnace body 1, although not shown, that its upper opening 50a is higher than the maximum permissible level $H_2$ of the molten metal M in the reverberatory furnace body 1 and that its lower opening 50b is positioned within the molten metal M whose level $H_1$ is the minimum level to circulate the molten metal M as shown by the arrows in the reverberatory furnace.

A fine aluminum scrap m' is discharged at a constant rate into the molten metal flow in the guide trough 12 from the feeder 30 with energization of the drive source 30a, as shown by the arrow Y. The fine aluminum scrap m' is mixed with the molten metal M in the guide trough 12. The mixture falls down into the guide frame 50 from the discharge end of the guide trough 12, and it is more effectively mixed and sunk into the molten metal M in the guide frame 50 by guide function of the latter, kinetic energy due to falling and successive fall of the mixture discharged from the guide trough 12. The mixture is prevented from spreading, by the guide frame 50, when it is dropped onto the molten metal. While the fine aluminum scrap m' is sunk down in the molten metal within the guide frame 50, it is molten receiving heat from the surrounding molten metal M. Even when the not-molten aluminum scrap m' is discharged from the lower opening 50b of the guide frame 50, it can be molten while rising towards the molten metal surface. In this embodiment, almost of all the fine aluminum scrap m' discharged from the feeder 30 is perfectly molten before it reaches the lower opening 50b of the guide frame 50. If the guide frame 50 is not provided in the reverberatory furnace, the mixture of the molten metal M and aluminum scrap m' would spread to some extent on the molten metal surface when falling from the guide trough 12. At such a case, the aluminum scrap m' becomes liable to float on the molten metal surface and to contact with air. However, according to this embodiment, even fine metal scrap which is very liable to float can be effectively sunk down in the molten metal M, and can be molten receiving heat from the surrounding molten metal without air contact.

While the preferred embodiments have been described, variations thereto will occur to those skilled in the art within the scope of the present inventive concepts which are delineated by the following claims.

For example, in the above embodiments, aluminum or aluminum alloy is molten in the reverberatory furnace. However, any other metal, for example, copper and brass may be molten in the above embodiments. But the reverberatory furnaces of the fourth to sixth embodiments are most suitable for melting aluminum scrap and aluminum alloy scrap which has good affinity for oxygen at high temperature.

Further, in the second and third embodiments, the first core section $20A_1$ and the corresponding portion of the bottom board 8 or 23 are wholly horizontal. However, only at least one part of them may be horizontal, since the intensity of the magnetic field is particularly low in the top end of the first core section $20A_1$.

Further in the fourth to sixth embodiments, the vibratory feeder is used as a feeder in the reverberatory fournace. However, any other feeding means such as a screw conveyor may be used in these reverberatory furnace. Or metal to be molten may be supplied into the guide trough 12, the intermediate vessel 42 or the guide frame 50 directly from the hopper 31 or 40. At that case, the hopper has a gate, and when metal is fed, the gate is opened.

Further, in the above embodiments, the hot molten metal is supplied through the hot molten metal vessel 4 into the electromagnetic trough 7 from the reverberatory furnace body 1. However, the hot molten metal may be supplied into the electromagnetic trough 7 directly from the reverberatory furnace body 1.

Further in the sixth embodiment, the guide frame 50 is conical. However, it may be cylindrical.

What is claimed is:

1. A reverberatory furnace comprising:
   (a) a reverberatory furnace body for melting metal and holding molten metal, said reverberatory furnace body including an opening well;
   (b) an electromagnetic trough for transporting molten metal from said reverberatory furnace body upwardly and slantly, said electromagnetic trough including:
      (i) means for generating a travelling magnetic field comprising an iron core having grooves therein and AC coils within said grooves, said iron core comprising a plurality of core sections arranged in a lengthwise direction relative to said electromagnetic trough; and
      (ii) a refractory bottom board arranged on said magnetic field generating means, said bottom board and said magnetic field generating means constituting a bottom portion of said electromagnetic trough, such that at least one portion of the first of said core sections when viewed from the lower side of said electromagnetic trough and the corresponding portion of said bottom board above said portion of the first of said core sections are horizontal; and
   (c) means for guiding the molten metal from said electromagnetic trough to said opening well.

2. A reverberatory furnace comprising:
   (a) a reverberatory furnace body for melting metal and holding molten metal, said reverberatory furnace body including an opening well;
   (b) an electromagnetic trough for transporting molten metal from said reverberatory furnace body upwardly and slantly, said electromagnetic trough including:
      (i) means for generating a travelling magnetic field comprising an iron core having grooves therein and AC coils within said grooves; and
      (ii) a refractory ceramic bottom board, which is formed of aluminum titanate and which is pre-baked, arranged on said magnetic field generating means, said bottom board and said magnetic field generating means constituting a bottom portion of said electromagnetic trough; and
   (c) means for guiding said molten metal from said electromagnetic trough to said opening well.

3. A reverberatory furnace comprising:
   (a) a reverberatory furnace body for melting metal and holding molten metal, said reverberatory furnace body having side walls and including an opening well;
   (b) a vessel for holding molten metal in communication with the interior of said reverberatory furnace body;
   (c) an electromagnetic trough along a side wall of said reverberatory furnace body for transporting molten metal from the vessel in communication with said reverberatory furnace body upwardly and slantly, said electromagnetic trough including:
      (i) means for generating a travelling magnetic field comprising an iron core having grooves therein and AC coils received in said grooves, said iron core comprising a plurality of core sections arranged in a lengthwise direction relative to said electromagnetic trough; and
      (ii) a refractory bottom board arranged on said magnetic field generating means, said bottom board and said magnetic field generating means constituting a bottom portion of said electromagnetic trough, such that at least one portion of the first of said core sections when viewed from the lower side of said electromagnetic trough and the corresponding portion of said bottom board above said portion of the first of said core sections are horizontal; and
   (d) means for guiding the molten metal from said electromagnetic trough to said opening well, said guiding means being laterally connected to the top end portion of said electromagnetic trough.

4. A reverberatory furnace according to claim 3 in which the corresponding portion of said bottom board above said portion of the first of said core sections is substantially flush with the bottom of the vessel that holds molten metal.

5. A reverberatory furnace comprising:
   (a) a reverberatory furnace body for melting metal and holding molten metal, said reverberatory furnace body including an opening well;
   (b) means for feeding the metal to be melted into the opening well;
   (c) an electromagnetic trough for transporting molten metal from said reverberatory furnace body upwardly and slantly, said electromagnetic trough including means for generating a travelling magnetic field;
   (d) means for guiding the molten metal from said electromagnetic trough to said opening well; and
   (e) a vessel having an upper inlet and a lower outlet narrower than the inlet, the lower outlet being in communication with the opening well whereby the molten metal from said guiding means and the metal from said feeding means are passed through the upper inlet into said vessel and are combined before passing through the lower outlet into said opening well.

6. A reverberatory furnace according to claim 5 in which said vessel is conical.

7. A reverberatory furnace according to claim 5 in which said metal is in the form of fine scrap.

8. A reverberatory furnace according to claim 7 in which said metal is aluminum or aluminum alloy.

9. A reverberatory furnace comprising:
   (a) a reverberatory furnace body for melting metal and holding molten metal, said reverberatory furnace body including an opening well;
   (b) means for feeding the metal to be melted into the opening well;
   (c) an electromagnetic trough for transporting molten metal from said reverberatory furnace body upwardly and slantly, said electromagnetic trough including means for generating a travelling magnetic field;
   (d) means for guiding the molten metal from said electromagnetic trough to said opening well; and
   (e) a guide frame having an upper inlet opening and a lower outlet opening, the upper inlet opening being higher than the maximum level of the molten metal in said reverberatory furnace body and the lower outlet opening being positioned within the molten metal in said reverberatory furnace body whereby the molten metal from said guide means and the metal from said feed means are passed through the upper inlet opening into said guide frame and are combined before passing through the lower outlet opening into said opening well.

10. A reverberatory furnace according to claim 9 in which said guide frame is conical.

11. A reverberatory furnace according to claim 9 in which said metal is in the form of fine scrap.

12. A reverberatory furnace according to claim 11 in which said metal is aluminum or aluminum alloy.

* * * * *